No. 807,807. PATENTED DEC. 19, 1905.
J. G. BROMAN.
WATER PURIFIER.
APPLICATION FILED JUNE 9, 1905.
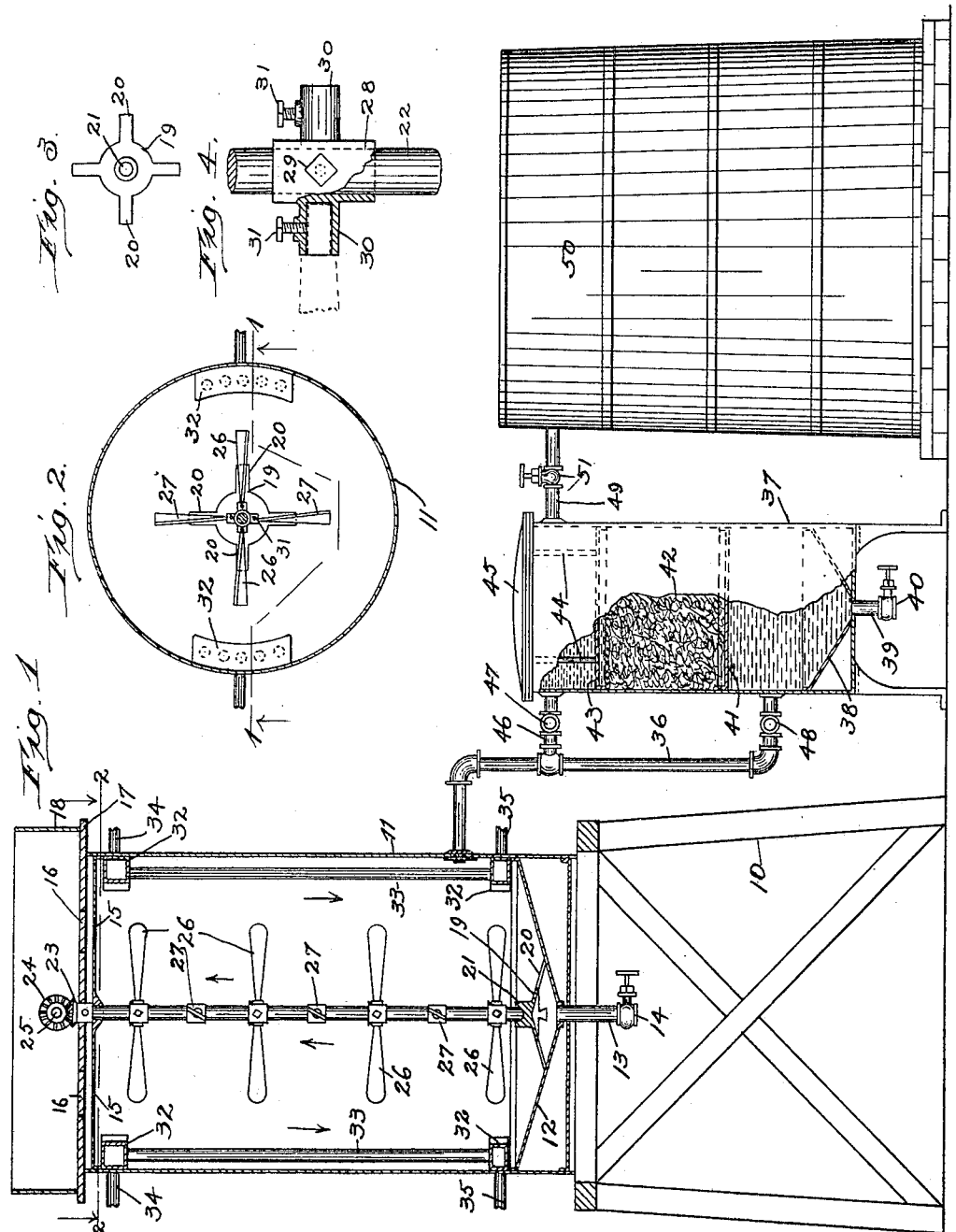
Witnesses:
Chas. E. Gorton.
M. A. Nyman.
Inventor:
John G. Broman.
By Chas. C. Tillman
Atty.

UNITED STATES PATENT OFFICE.

JOHN G. BROMAN, OF CHICAGO, ILLINOIS.

WATER-PURIFIER.

No. 807,807.  Specification of Letters Patent.  Patented Dec. 19, 1905.

Application filed June 9, 1905. Serial No. 264,490.

*To all whom it may concern:*

Be it known that I, JOHN G. BROMAN, a citizen of the United States, residing at Chicago, in the county of Cook and State of Illinois, have invented certain new and useful Improvements in Water-Purifiers, of which the following is a specification.

This invention relates to improvements in an apparatus to be used for the purification of water, and while it is more especially intended to be employed for purifying water to be used in steam-boilers to prevent the formation of scale, pitting, and corrosion therein and while I have illustrated the parts of the apparatus arranged in connection with a storage-tank in about the manner employed when used for such tanks on railroads to furnish water to the locomotives yet it is applicable for purifying water to be used for various other purposes and its parts may be differently located; and it consists in certain peculiarities of the construction, novel arrangement, and operation of the various parts thereof, as will be hereinafter more fully set forth and specifically claimed.

The principal object of the invention is to provide an apparatus for purifying water which shall be comparatively simple and inexpensive in construction, strong, durable, and efficient, positive and satisfactory in operation, and which shall be so made that the same apparatus may be used for treating or purifying water by either what is termed the "cold" or "hot" precipitation process.

Another important object of the invention is to provide means whereby a continuous circulation and thorough agitation or stirring of the water within the precipitating reservoir or receptacle will be afforded, thus causing perfect commingling or mixture of the water with the chemicals or compound used for separating and precipitating the mineral, vegetable, and other deleterious matter held in solution by the water. Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a view, partly in section and partly in elevation, of an apparatus embodying my invention, the section being taken on line 1 1 of Fig. 2 looking in the direction indicated by the arrows. Fig. 2 is a plan sectional view taken on line 2 2 of Fig. 1 looking in the direction indicated by the arrows. Fig. 3 is a detached view of the support for one end of the shaft which carries the stirring-blades; and Fig. 4 is a view, partly in section and partly in elevation, of said shaft, showing one of the supports thereon for adjustably securing the blades thereto.

Like numerals of reference refer to corresponding parts throughout the different views of the drawings.

The reference-numeral 10 designates a supporting-frame, which may be of any suitable size, form, and material, on which is vertically mounted the precipitating reservoir or receptacle 11, which is preferably cylindrical in shape, as shown. The lower portion of the reservoir 11 is provided with a funnel-shaped false bottom 12, in the center or depressed portion of which is located a pipe or tube 13, used for discharging the precipitated deposits or mineral and vegetable matter. The lower end of the tube or pipe 13 is provided with a shut-off valve 14 of the ordinary or any preferred construction. The upper end of the reservoir 11 has in its top openings 15, which register with openings 16 in the platform 17, which is mounted on the top of the receptacle 11 and is provided near its edge with a railing 18 when the apparatus is constructed on a large scale for use at railway water-tanks, as shown in the drawings and as before mentioned, in order to protect the operator or attendant who may desire to stand on the platform 17 while depositing the precipitating chemicals or compounds through the openings 15 and 16 into the water contained in the reservoir. Mounted on the upper surface of the false bottom 12 of the reservoir is a conically-shaped supporting-spider 19, which has radial arms 20 to rest on said bottom, so as to produce spaces between the body of the spider and the false bottom, on which the arms 20 rest. The body of the spider is provided at its apex with a vertical socket 21 to form a bearing for the lower end of the stirring-shaft 22, which is vertically and centrally journaled in the reservoir 11, as is clearly shown in Fig. 1 of the drawings. Mounted on the upper end of the shaft 22 is a beveled gear 23, which meshes with a similar gear or pinion 24, mounted on a shaft 25, horizontally journaled, and which shaft may be suitably driven so as to impart rotary motion to the shaft 22, which carries a series of blades 26 and 27, which are arranged in pairs, said pairs being alternately disposed at right angles to one another. These blades are adjustably held on the shaft 22 by means of a series of supporting-sleeves 28, which are slidably mounted on the shaft 22 and may be fixed thereon by means of set-screws 29. Projecting laterally from opposite sides of each of the sleeves 28 are socketed extensions 30 to receive the inner ends of the blades, and said extensions are each provided with set-screws 31, used to fix the blades at the desired angles, which blades may be flat-faced or shaped like the blades of a propeller for boats, so that when the shaft 22 is rotated the volume of water surrounding the shaft 22 and acted upon by the blades will be caused to travel upwardly, while that portion of the water adjacent to the walls of the vessel 11 will be caused to move downwardly, thus creating a continuous circulation.

Located diametrically opposite each other at the top and bottom of the reservoir 11 are horizontally-disposed headers 32, which are connected together in pairs by means of a series of pipes 33, which are vertically arranged to prevent lodgment of the precipitating matter thereon. Leading into each of the headers 32 at the top of the reservoir 11 is a pipe 34, the other end of which may be connected to a supply of steam, such as the exhaust-outlet of an engine. Leading from each of the headers 32 at the botton of the reservoir is a pipe 35 for the discharge of water from said headers and their connecting-pipes caused by the condensation of the steam.

Communicating at one of its ends with the lower portion of the reservoir 11, usually at a slight distance above the false bottom 12 therein, is a pipe 36, the other end of which communicates with the lower portion of a filtering vessel or tank 37, which may be suitably supported at a desired distance from the precipitating-reservoir, but usually below the same. The lower portion of the filtering-tank 37 is provided with a funnel-shaped false bottom 38, which has in its center or depressed portion an outlet-pipe 39, which is provided with a shut-off valve 40 of any desired construction. Horizontally located near the middle of the tank 37 is a perforated partition 41, on which rests a quantity of filtering material 42 of any preferred kind. Horizontally located above the filtering material within the tank 37 is another perforated partition 43, which may be held in place by means of lugs or extensions 44 on the lower or inner surface of the top or head plate 45 of said vessel. Communicating at one of its ends with the pipe 36 and at its other end with the upper portion of the filter 37 is a pipe 46, which is provided with a shut-off valve 47 of any well-known construction. The lower portion of the pipe 36 is also provided with a valve 48 to regulate or shut off the flow of water therethrough. Leading from the upper portion of the filter 37 is a discharge-pipe 49, which may communicate at its other end with a storage-tank 50 or which may lead to any suitable point to which it is desired to supply the purified water. This pipe is also provided with a valve 51 for regulating or shutting off the flow of liquid therethrough.

By providing the filtering-tank 37 with the horizontal partitions 41 and 43 it is apparent that said tank will be divided into three compartments, the middle one of which is supplied with suitable filtering material through which the water is forced upwardly from the lower compartment into the upper one, from which it is discharged into the storage-tank or otherwise.

From the foregoing and by reference to the drawings it will be seen and clearly understood that by supplying the precipitating-reservoir 11 with water and by applying power to the shaft 25 the shaft 22, carrying the stirring and propelling blades 26 and 27, will be rotated, in which operation the volume of water adjacent to the shaft 22 will be caused by reason of the inclination of the blades 26 and 27 to move upwardly, as indicated by the arrows in Fig. 1, while that portion of the water adjacent to the walls of the reservoir 11 will be forced downwardly to the bottom of the receptacle, from whence it will again be forced upwardly, thus producing a continuous circulation and thorough stirring and commingling of the water and precipitating chemicals or compounds, which may be of the ordinary or any preferred kind employed for precipitating and separating the mineral, vegetable, and other deleterious matter from the water. This material may be placed in the reservoir 11 while the water is being agitated by the blades 26 and 27 or before the agitation is commenced.

In some instances it is desirable in order to facilitate the precipitation of the solids from the water that it shall be heated or its temperature raised, and for this purpose the pipes 33 are employed. By locating these pipes vertically, as shown and above described, and by inclining the false bottom 12 downwardly toward its center and by using the spider-support 19 for the lower end of the shaft 22 it is apparent that the precipitates will be free to find their way to the bottom of the reservoir and that lodgments therefor will be reduced to the minimum. When thus collected in the bottom of the reservoir, it is obvious that the solid matter may be drawn off through the pipe 13 and that the purified water will pass through the pipe 36 into the lower portion of the filter 37, when by reason of the pressure within the reservoir it will be caused to pass through the filtering material 42 into the upper compartment of the filter, which operation will eliminate any and all impurities which might be carried by the water from the precipitating-reservoir. When the above operation is being carried out, it is apparent that the valve 47 should be closed, while the valves 48 and 51 should be open, thus permitting the water to pass upwardly through the filtering material and into the storage-tank or to the point where it is desired to supply the purified water. In order to flush and cleanse the filtering material 42, the valves 48 and 51 are closed, while the valves 47 and 40 are opened, thus allowing the water to pass downwardly through the filtering material and out through the discharge-pipe 40 in the bottom of the filter. As before stated and as shown in Figs. 1, 2, and 3 of the drawings, the body of the spider 19 is circular and slightly conical in shape and is provided with the arms 20 to hold said body portion at a distance from the bottom 12, thereby causing the liquid when the discharging-pipe 13 is open to pass between the edge of the body portion of the spider and the inclined floor 14, thus removing any sediment which might rest on said bottom.

Having thus fully described my invention, what I claim as new, and desire to secure by Letters Patent, is—

1. In an apparatus for purifying water, the combination with a reservoir adapted to receive water and precipitating material, of a rotary shaft journaled therein, a series of oppositely-extending blades arranged in pairs on said shaft, means to adjust the inclination of said blades, a series of hollow headers located within the reservoir near its top and bottom, a series of steam-pipes located vertically within and near the walls of the reservoir and communicating with said headers, a steam-pipe communicating with each of the headers in the upper portion of the reservoir and a discharging-pipe communicating with each of the headers in the lower portion of the reservoir, substantially as described.

2. In an apparatus for purifying water, the combination with a reservoir adapted to receive water and precipitating material, and having in its lower portion a funnel-shaped bottom, a discharge-pipe in said bottom, a shut-off valve in said pipe, a conical-shaped socketed support located on said bottom, a shaft vertically journaled in the reservoir and having its lower end located in the socket of said support, means to rotate the shaft, a series of oppositely-extending blades arranged in pairs alternately disposed at right angles to one another, means to adjustably secure the blades on the shaft and to adjust their inclination, a series of steam-pipes located vertically in groups within the reservoir and near the walls thereof, means to convey steam into the upper portion of each of said groups of pipes, a discharging-pipe communicating with the lower portion of each of said groups of pipes, a filter located near the reservoir, a pipe communicating at one of its ends with the lower portion of the reservoir and having communication with the filter, and a discharge-pipe leading from the upper portion of the filter, substantially as described.

JOHN G. BROMAN.

Witnesses:
CHAS. C. TILLMAN,
M. H. NYMAN.